United States Patent Office 3,366,644
Patented Jan. 30, 1968

3,366,644
ORTHO-DITHIIN PRODUCTION
George B. Payne, Berkeley, Calif., assignor to Shell Oil Company, New York, N.Y., a corporation of Delaware
No Drawing. Filed Oct. 15, 1965, Ser. No. 496,678
10 Claims. (Cl. 260—327)

ABSTRACT OF THE DISCLOSURE

Ring-substituted 3,6-dihydro-o-dithiins of at least 5 carbon atoms, useful as biological chemicals and as chemical intermediates, are produced by contacting a conjugated diene of at least 5 carbon atoms, sulfur dioxide and hydrogen sulfide.

---

This invention relates to an improved method for the production of certain cyclic disulfides and to the novel products thereby produced. More particularly the invention relates to ring-substituted 3,6-dihydro-o-dithiins.

The class of 3,6-dihydro-o-dithiins is characterized by the presence therein of a six-membered ring wherein two adjacent ring members are sulfur, the remaining ring members are carbon and the two carbon atoms directly adjacent to the disulfide moiety are not a member of an unsaturated carbon-carbon linkage. The simplest member of this class, 3,6-dihydro-o-dithiin represented by the following formula

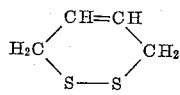

has been prepared, Schöberl et al., Ann., 614, 66 (1958), but is disclosed as being unstable and the compound readily polymerizes at or above room temperature.

It is an object of the present invention to provide an improved method for the production of ring-substituted 3,6-dihydro-o-dithiins and the novel ring-substituted dithiin products thereby produced.

It has now been found that these objects are accomplished by reaction of a conjugated diene of at least five carbon atoms with sulfur dioxide and hydrogen sulfide in liquid-phase solution in inert reaction solvent. Although the mechanism of the reaction is not understood with certainty, it is considered likely that under the conditions of the reaction, the hydrogen sulfide and sulfur dioxide react to form an elemental sulfur species of on more than 2 sulfur atoms, which sulfur species is "trapped" by the conjugated diene, thereby forming a ring-substituted 3,6-dihydro-o-dithiin product.

The conjugated diene reactant employed in the process of the invention comprises a conjugated diene of at least five carbon atoms, i.e., the diene has at least one organic substituent one one of the four carbon atoms forming the basic four-carbon conjugated diene moiety. Although conjugated dienes of relatively complex or of comparatively simple structure are suitably employed as reactant, best results are obtained when the conjugated diene reactant is a hydrocarbon diene having no more than one organic substituent on any one carbon atom of the basic four-carbon conjugated diene moiety. One class of such conjugated dienes has up to 20 carbon atoms and is represented by the formula

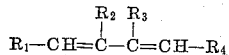

wherein $R_1$, $R_2$, $R_3$ and $R_4$ are independently selected from hydrogen, alkyl of up to 10 carbon atoms, aralkyl of up to 10 carbon atoms, aryl of up to 10 carbon atoms or alkaryl of up to 10 carbon atoms with at least one of $R_1$, $R_2$, $R_3$ or $R_4$ being other than hydrogen. Illustrative of suitable substituent groups other than hydrogen are methyl, ethyl, butyl, isoamyl, octyl, decyl, benzyl, β-phenylethyl, phenyl, naphthyl, tolyl, xylyl and p-tert-butylphenol. Particularly preferred are the conjugated dienes of the above formula of from 1 to 4, preferably of from 1 to 2, non-hydrogen substituents which are lower alkyl, i.e., alkyl of up to 4 carbon atoms, especially methyl. Exemplary diene reactants of from 1 to 2 methyl substituents include isoprene, 1,3-pentadiene, 2,3-dimethylbutadiene and 2-methyl-1,3-pentadiene.

In the process of the invention, the conjugated diene reactant is contacted with sulfur dioxide and hydrogen sulfide. From stoichiometric considerations of the process, it is desirable to employ a molar amount of hydrogen sulfide of twice the molar amount of sulfur dioxide, although greater or lesser proportions are suitably utilized. Molar ratios of hydrogen sulfide to sulfur dioxide of from about 1:1 to about 5:1 are suitable with molar ratios of from about 2:1 to about 4:1 being preferred. The conjugated diene reactant is preferably employed in molar amounts equal to or in excess over the sulfur dioxide. Molar ratios of conjugated diene to sulfur dioxide from about 1:1 to about 10:1 are suitable with best results being obtained when a molar ratio of from about 2:1 to about 5:1 is utilized.

The reactants are contacted in liquid-phase solution in an inert solvent, and solvents which are liquid at reaction temperature and pressure and are inert towards the reactants and the products produced therefrom are suitably employed. Illustrative of suitable solvents are those free from aliphatic unsaturation including hydrocarbons such as hexane, isooctane, decane, cyclohexane, decahydronaphthalene, benzene, toluene and xylene; halogenated hydrocarbons including chloroform, carbon tetrachloride and methylene bromide; nitriles such as acetonitrile, propionitrile and benzonitrile; alcohols as illustrated by methanol, ethanol, tert-butanol and isopropanol; ketones, particularly lower alkanones such as acetone, methyl ethyl ketone and methyl isobutyl ketone; ethers such as dialkyl ethers, e.g., dibutyl ether, dioctyl ether and methyl hexyl ether, cyclic ethers, e.g., dioxane and tetrahydrofuran, and ethers (full) of polyhydric alcohols or poly(oxyalkylene)glycols such as dimethoxyethane, glycerol triethyl ether, diethylene glycol diethyl ether and tetraethylene glycol dimethyl ether; lower carboxylic acids including acetic acid and propionic acid; tertiary amines, both acyclic and heterocyclic, such as triethylamine, N-methylpyrrolidine and pyridine; and water. In general, preferred solvents comprise oxygenated solvents, particularly water, ketones and carboxylic acids. The amount of reaction solvent is not critical, although best results are obtained when the reactants are comparatively dilute as when the solvent is present in amounts of from about 0.1 liter to about 2 liters per mole of total reactants.

The initial reaction of the conjugated diene, the sulfur dioxide and the hydrogen sulfide is facilitated by the presence of small amounts of water, e.g., from about 0.001 mole to about 0.5 mole of water per mole of total reactants. The precise role of the water is not completely understood, but it is considered likely that the water serves as a catalyst during the course of the reaction. It should be appreciated that reaction of sulfur dioxide with hydrogen sulfide produces water as a product along with an elemental sulfur species so that the reaction is in effect autocatalytic. Thus, the initial presence of added water is not required, although as previously stated it is generally preferred to introduce a small amount of water into the reaction mixture in the modifications of the process wherein water is not employed as reaction solvent.

It is also desirable at times to employ small amounts of a polymerization inhibitor in order to minimize the formation of polymeric product, e.g., polymeric derivatives of the conjugated diene reactant. Conventional polymerization inhibitors, e.g., hydroquinone, benzoquinone, chloranil 2,6-di-tert-butyl-4-methylphenol or the like are satisfactorily employed. Amounts of inhibitor up to about 0.05 mole per mole of total reactants are suitable.

The method of reactant contacting is not critical. In one modification, the entire amounts of reactants and solvent are charged to an autoclave or similar pressure reactor and maintained at reaction temperature until reaction is complete, typically a period of several hours, e.g., 2 hours, or less. In an alternate modification, one or more reactants is added to the remaining reaction mixture components in increments as by adding sulfur dioxide to a mixture comprising the conjugated diene, hydrogen sulfide and reaction solvent. In yet another modification the process is conducted in a continuous manner as by contacting the reactants during passage through a tubular reactor. Best results are obtained, in any modification, if means are provided to promote efficient reactant contacting as by shaking, stirring or rocking a batch-type reactor or by providing baffles in a continuous-type reactor.

The process of the invention is conducted in the liquid phase at an elevated temperature and generally at an elevated pressure. Typical reaction temperatures vary from about 80° C. to about 200° C. with the temperature range of from about 125° C. to about 175° C. being preferred. The precise reaction pressure is not critical, provided that the reaction mixture is maintained substantially in the liquid phase. Reaction pressures from about 0.5 atmosphere to about 10 atmospheres are satisfactory. Good results are frequently obtained when the reaction pressure is autogenous, i.e., that pressure generated by the reaction mixture components when heated to reaction temperature in a sealed reaction vessel. Subsequent to reaction, the product mixture is separated and the dithiin product recovered by conventional means, as by selective extraction, fractional distillation, fractional crystallization or the like.

In the above-discussed modification of the process of the invention, the diene reactant and the sulfur dioxide are introduced as separate reactants. In an alternate and frequently preferred modification of the process, the sulfur dioxide and at least a portion of the conjugated diene reactant are provided in a chemically combined form, for example, in the form of 3-sulfolene. It is known that sulfur dioxide and conjugated dienes react to form 3-sulfolenes, e.g., from isoprene and sulfur dioxide is produced 3-methyl-3-sulfolene. It is also known that 3-sulfolenes decompose at elevated temperature, thereby regenerating conjugated diene and sulfur dioxide. In the present modification, therefore, a 3-sulfolene is employed at the source of sulfur dioxide and at least a portion of the conjugated diene reactant. In terms of the preferred conjugated dienes described above, suitable 3-sulfolenes have at least 5 carbon atoms and are represented by the formula

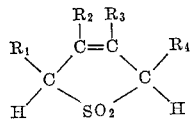

wherein $R_1$, $R_2$, $R_3$ and $R_4$ have the previously stated significance. When a 3-sulfolene is employed as reactant to provide sulfur dioxide and conjugated diene, decomposition results in the formation of one mole of diene and one mole of sulfur dioxide for each mole of the 2-sulfolene present. In the instances where it is desired to employ an excess of diene reactant, an amount of conjugated diene as above described of up to 9 moles of diene per mole of the 3-sulfolene is added to the reaction system. Of course, no additional conjugated diene is required for as is stated above, the reaction is suitably operated at a molar ratio of the conjugated dient to sulfur dioxide of 1:1. In terms of the preferred reactant ratios, from about 1 to about 4 moles of additional conjugated diene is provided for each mole of the 2-sulfolene. In this modification wherein there is generated one mole of sulfur dioxide for each mole of 3-sulfolene utilized, molar ratios of hydrogen sulfide to the 3-sulfolene of from about 1:1 to about 5:1, preferably from about 2:1 to about 4:1, are satisfactory. The modification of the process wherein the sulfur dioxide and at least a portion of the conjugated diene are provided in a chemically combined form is otherwise conducted according to the procedure above described wherein the sulfur dioxide and conjugated diene are provided separately, e.g., the reaction is conducted at the elevated temperature and in the liquid phase solution as previously described.

The products of the process of the invention are 3,6-dihydro-o-dithiins having at least one organic substituent on a carbon atom which is a member of the dithiin ring. In terms of the preferred diene reactants as described above, the products are represented by the formula

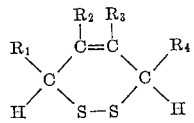

wherein $R_1$, $R_2$, $R_3$ and $R_4$ have the previously stated significance. Illustrative products include 4-methyl-3,6-dihydro-o-dithiin produced from isoprene, 4,5-dimethyl-3,6-dihydro-o-dithiin produced from 2,3-dimethylbutadiene, 3-methyl-3,6-dihydro-o-dithiin produced from 1,3-pentadiene and other illustrative products such as 4-phenyl-3,6-dihydro-o-dithiin, 3-propyl-3,6-dihydro-o-dithiin, 4-ethyl-5-methyl-3,6-dihydro-o-dithiin and 3-ethyl-5-(p-tolyl)-3,6-dihydro-o-dithiin. The ring-substituted dithiin products are characterized by enhanced stability as compared to the unsubstituted 3,5-dihydro-o-dithiin which, because of the instability thereof, is not suitably prepared by the present process. Although crude samples of the ring-substituted dithiins do decompose to some extent upon standing, relatively pure samples of the ring-substituted products, e.g., samples of at least 90–95% purity, exhibit considerable storage stability, particularly at somewhat reduced temperatures.

The products of the invention find utility as biological chemicals, particularly as anthelmintics, and are additionally useful as chemical intermediates, being reduced via the cleavage of the sulfur-sulfur bond with chemical reducing agents such as lithium aluminum hydride to the corresponding dithiols, which dithiols are useful as curing agents for epoxy resins or as the precursors of useful thioethers, thioesters or the like.

To further illustrate the improved process of the invention and the novel products obtained thereby, the following examples are provided. It should be understood that the details thereof are not to be regarded as limitations, as the teachings thereof may be varied as will be understood by one skilled in this art.

*Example I*

To an autoclave was charged a mixture of 24.6 g. of 2-methyl-1,3-pentadiene, 15.9 g. of hydrogen sulfide, 100 ml. the acetone, 1 ml. of water and 0.2 g. of hydroquinone. While the reaction mixture was stirred and maintained at 140° C., 12.8 g. of liquid sulfur dioxide was slowly introduced under pressure. After an additional 0.5 hour period at 150° C., the reactor was cooled and the volatile material removed from the product mixture by maintaining the mixture at room temperature and 10 mm. pressure. The resulting concentrate was distilled at reduced pressure to afford 9.6 g. of a yellow liquid, B.P. 60–67° C. at 1 mm., which was analyzed by gas-liquid chromatography and found to contain 85% of 3,5-dimethyl-3,6-dihydro-o-dithiin. This represented a 20% yield of dithiin product based upon the sulfur dioxide charged.

When the above procedure is repeated employing isoprene as reactant, a good yield of 4-methyl-3,6-dihydro-o-dithiin is obtained.

Example II

To an autoclave were charged 26.4 g. of 3-methyl-3-sulfolene, 34 g. of isoprene, 150 ml. of acetone, 15 g. of hydrogen sulfide, 1 ml. of water, and 0.5 g. of hydroquinone. The autoclave was heated with rocking over a one-half hour period to a temperature of 150±5° C. After an additional hour at that temperature, the vessel was cooled and the product mixture was removed and concentrated at room temperature and 10 mm. pressure. The concentrate was distilled at a pressure of less than 1 mm. to obtain 16.0 g. of a yellow liquid boiling in the 45–65° C. range. Gas-liquid chromatographic analysis of the distillate indicated the presence of 73% by weight 4-methyl-3,6-dihydro-o-dithiin, which represented a yield of 30% based upon the 3-methyl-3-sulfolene charged. An 8.9 g. sample of the crude product was redistilled to give 4-methyl-3,6-dihydro-o-dithiin, B.P. 51–52° C. at 2 mm., $n_D{}^{25}$ 1.5827. The structure of the product was confirmed by the ultraviolet and nuclear magnetic resonance spectra which were consistent with the above formula. The product had the following elemental analysis.

*Analysis.*—Calc., percent wt.: C, 45.4; H, 6.1; S, 48.5. Found, percent wt.: C, 46.6; H, 6.1; S, 45.6.

Example III

By procedures similar to that of Example II, a series of runs was conducted wherein 0.2 mole of 3-methyl-3-sulfolene was contacted with 0.45 mole of hydrogen sulfide and varying amounts of excess isoprene under a variety of reaction conditions. The results of this series is shown in Table I, wherein solvent A is dimethoxyethane and solvent B is acetone, and the term "yield" refers to the yield of 4-methyl-3,6-dihydro-o-dithiin based on the sulfolene charged.

TABLE I

| Run | 1 | 2 | 3 | 4 | 5 |
|---|---|---|---|---|---|
| Isoprene, molar | 0.5 | 0.5 | 0.5 | 0.2 | 0.5 |
| Solvent | A | A | B | B | B |
| Solvent Vol., ml | 150 | 400 | 150 | 150 | 800 |
| Temp., °C | 145 | 145 | 150 | 160 | 150 |
| Time, hr | 1 | 3 | 1 | 0.5 | 2.5 |
| Yield, percent | 21 | 33 | 21 | 21 | 40 |

Example IV

By procedures similar to that of Example II, a series of runs was conducted wherein various solvents were employed as reaction media in the reaction of 0.1 mole of 2,4-dimethyl-3-sulfolene with 0.25 mole of hydrogen sulfide in the presence of 150 ml. of the solvent, 1 ml. of water and 0.1 g. of hydroquinone. The reactions were conducted in a stirred autoclave at a temperature of 130–140° C. employing reactions times of 0.5–1.0 hr. The results of this series are shown in Table II wherein the term "yield of product" refers to the yield of distilled 3,5-dimethyl-3,6-dihydro-o-dithiin obtained, based on the sulfolene charged.

TABLE II

| Solvent: | Yield of product, percent |
|---|---|
| n-Hexane | 14 |
| Chloroform | 17 |
| Dimethoxyethane | 32 |
| Acetonitrile | 31 |
| Ethanol | 19 |
| Water | 28 |
| Acetic acid | 34 |
| Pyridine | 17 |
| Acetone | 35 |

Example V

By procedures similar to that of Example II, a series of runs was conducted employing as reactants 0.2 mole of variously substituted 3-sulfolenes, 0.5 mole of the corresponding conjugated diene and 0.45 mole of hydrogen sulfide in 150 ml. of acetone containing 1 ml. of water and 0.2 g. of hydroquinone. The reaction temperature in each case was 150° C. and the reaction time was 2 hours. The results of this series are shown in Table III wherein the term "sulfolene substituents" indicates the position and type of ring substituents of the 3-sulfolene reactant, and the term "yield" represents the yield of the 3,6-dihydro-o-dithiin product, the substituents of which product and the location thereof being listed under the heading "Product Substituents."

TABLE III

| Sulfolene Substituents | Yield, percent | Product Substituents | Boiling Range of Product, °C | Refractive Index of Product, $n_D{}^{20}$ | Analysis Element, percent weight | Calc. | Found |
|---|---|---|---|---|---|---|---|
| 2-methyl | 15 | 3-methyl | 51–52 at 2 mm | 1.5674 | C | 45.4 | 44.7 |
| | | | | | H | 6.1 | 5.6 |
| | | | | | S | 48.5 | 45.1 |
| 3,4-dimethyl | 25 | 4,5-dimethyl | 75–76 at 2 mm | 1.5766 | C | 49.3 | 50.3 |
| | | | | | H | 6.9 | 7.1 |
| | | | | | S | 43.8 | 40.9 |
| 2,4-dimethyl | 40 | 3,5-dimethyl | 50–51 at 1 mm | 1.5623 | C | 49.3 | 47.2 |
| | | | | | H | 6.9 | 7.0 |
| | | | | | S | 43.8 | 42.6 |
| 2,5-dimethyl | 15 | 3,6-dimethyl | 49–50 at 1 mm | | C | 49.3 | 51.2 |
| | | | | | H | 6.9 | 7.4 |
| | | | | | S | 43.9 | 40.5 |

Example VI

To an autoclave were charged 13.2 g. (0.1 mole) of 3-methyl-3-sulfolene (isoprene sulfone), 8.2 g. (0.1 mole) of 2-methyl-1,3-pentadiene, 150 ml. of acetone, 1 ml. of water and 0.2 g. of hydroquinone. The reactor was flushed with nitrogen at room temperature, cooled with a Dry Ice-acetone bath and charged with 8.0–8.5 g. of hydrogen sulfide. The mixture was heated rapidly with stirring to 145–150° C. and held at that temperature for two hours. The reactor was then cooled and the product mixture was concentrated at room temperature and 5 mm., dissolved in chloroform and dried over magnesium sulfate. Distillation at reduced pressure gave 6.6 g. of distillate, B.P. 40–60° C. at less than 1 mm. The distillate was analyzed by gas-liquid chromatography which showed the presence of both 3,5-dimethyl-3,6-dihydro-o-dithiin and 4-methyl-3,6-dihydro-o-dithiin, present in a ratio of approximately 44:56.

I claim as my invention:

1. The process of producing a ring-substituted 3,6-dihydro-o-dithiin product by intimately contacting a conjugated diene of at least 5 carbon atoms of the formula

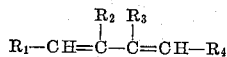

wherein $R_1$, $R_2$, $R_3$ and $R_4$ are independently selected from hydrogen, alkyl of up to 10 carbon atoms, aralkyl of up to 10 carbon atoms, aryl of up to 10 carbon atoms and alkaryl of up to 10 carbon atoms, with sulfur dioxide and hydrogen sulfide, in liquid-phase solution in inert solvent, at a temperature of from about 80° C. to about 200° C.

2. The process of producing a ring-substituted 3,6-dihydro-o-dithiin product by intimately contacting a conjugated diene of at least 5 carbon atoms of the formula

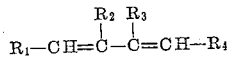

wherein $R_1$, $R_2$, $R_3$ and $R_4$ are independently selected from hydrogen and alkyl of up to 4 carbon atoms, with from about 0.1 mole to about 1 mole of sulfur dioxide per mole of said conjugated diene and from about 1 mole to about 5 moles of hydrogen sulfide per mole of sulfur dioxide, in liquid-phase solution in inert solvent at a temperature of from about 80° C. to about 200° C.

3. The process of claim 2 wherein $R_1$, $R_2$, $R_3$ and $R_4$ are independently selected from hydrogen and methyl.

4. The process of claim 3 wherein the conjugated diene is isoprene.

5. The process of claim 3 wherein the conjugated diene is 2-methyl-1,3-pentadiene.

6. The process of producing a ring-substituted 3,6-dihydro-o-dithiin product by intimately contacting the sulfolene of at least 5 carbon atoms of the formula

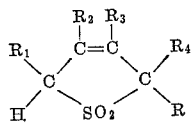

wherein $R_1$, $R_2$, $R_3$ and $R_4$ are independently selected from hydrogen, alkyl of up to 10 carbon atoms, aralkyl of up to 10 carbon atoms, aryl of up to 10 carbon atoms and alkaryl of up to 10 carbon atoms, with up to 9 moles per mole of said sulfolene of the conjugated diene of at least 5 carbon atoms of the formula

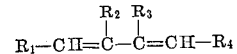

wherein $R_1$, $R_2$, $R_3$ and $R_4$ have the previously stated significance and from about 1 mole to about 5 moles of hydrogen sulfide per mole of said sulfolene, in liquid-phase solution in inert solvent at a temperature of from about 80° C. to about 200° C.

7. The process of claim 6 wherein $R_1$, $R_2$, $R_3$ and $R_4$ are independently selected from hydrogen and methyl.

8. The process of claim 7 wherein the sulfolene is 3-methyl-3-sulfolene.

9. The process of claim 7 wherein the sulfolene is 2,4-dimethyl-3-sulfolene.

10. The process of claim 7 wherein the sulfolene is 2-methyl-3-sulfolene.

References Cited

Schöberl et al.: Chemical Abstracts, vol. 52 (1958), page 20175f.

JAMES A. PATTEN, *Primary Examiner*.